United States Patent
Otto

(10) Patent No.: US 6,203,238 B1
(45) Date of Patent: Mar. 20, 2001

(54) SHAFT COUPLING WITH AXIAL ALIGNMENT

(75) Inventor: Dieter Otto, Ennepetal (DE)

(73) Assignee: LuK Automobiltechnik GmbH & Co., KG (DE)

( * ) Notice: Subject to any disclaimer, the term of this patent is extended or adjusted under 35 U.S.C. 154(b) by 0 days.

(21) Appl. No.: 09/143,900

(22) Filed: Aug. 31, 1998

(30) Foreign Application Priority Data

Aug. 30, 1997 (DE) ................................ 197 38 018

(51) Int. Cl.$^7$ ................................................. F16B 7/08
(52) U.S. Cl. ................ 403/354; 403/375; 403/383; 464/86
(58) Field of Search ........................ 403/354, 293, 403/380, 383, 294, 375; 464/86

(56) References Cited

U.S. PATENT DOCUMENTS

| | | |
|---|---|---|
| 1,166,835 | 1/1916 | Hogan . |
| 1,776,525 | 9/1930 | Talbot . |
| 2,654,234 * | 10/1953 | Christensen ...................... 403/292 X |
| 2,692,205 * | 10/1954 | Greider et al. ..................... 403/354 X |
| 3,222,772 | 12/1965 | Leyner . |
| 3,959,987 | 6/1976 | Garey ................................ 64/8 |
| 4,305,678 | 12/1981 | Majoor ............................. 403/361 |
| 4,474,488 | 10/1984 | Pinkerton et al. .................. 403/24 |
| 4,887,929 * | 12/1989 | Hale .............................. 403/354 X |
| 5,350,089 | 9/1994 | Preiser et al. .................... 222/413 |
| 5,442,973 * | 8/1995 | Liao ............................... 403/370 X |

FOREIGN PATENT DOCUMENTS

| | | |
|---|---|---|
| 767844 | 1/1953 | (DE) . |
| 4340064 | 1/1995 | (DE) . |
| 0694704 | 1/1996 | (EP) . |
| 2676518 | 11/1992 | (FR) . |
| 1577804 | 10/1980 | (GB) . |
| 2118683A | 3/1983 | (GB) . |

OTHER PUBLICATIONS

Great Britain Search Report dated Feb. 9, 1999.

* cited by examiner

Primary Examiner—Lynne H. Browne
Assistant Examiner—John R. Cottingham
(74) Attorney, Agent, or Firm—Ostrolenk, Faber, Gerb & Soffen, LLP

(57) ABSTRACT

A shaft coupling for connecting two shaft ends to transmit torque. Each shaft end has a recess or a projection. A projection on one shaft end projects into the recess in the other shaft end and their cooperating side walls transmit torque. A centering device at one shaft end cooperates with a centering device on the other shaft end for axially aligning the shaft ends. These may be a cylindrical projection one shaft end and a corresponding recess in the other shaft end. Alternatively, the centering devices are recesses in both shaft ends and a pin that extends into both of the centering recesses. Applied elastic material on at least one of the centering device elements enables secure attachment between the shaft ends.

16 Claims, 4 Drawing Sheets

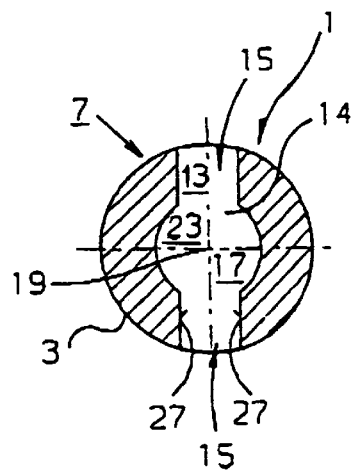
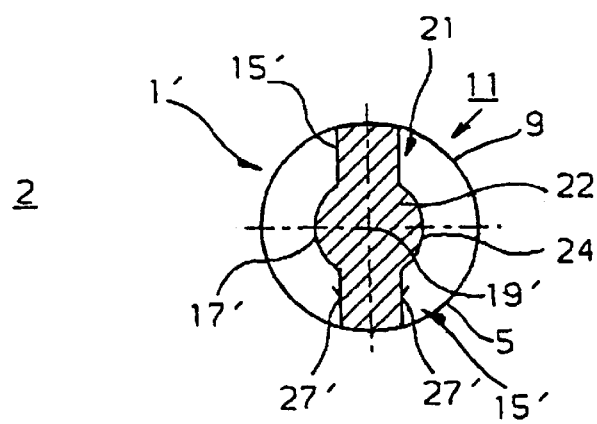
Fig.1a  Fig.1b
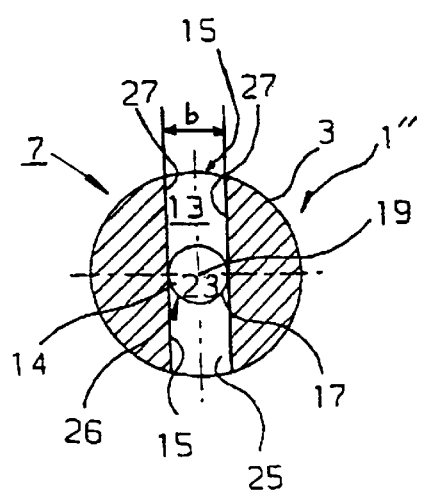
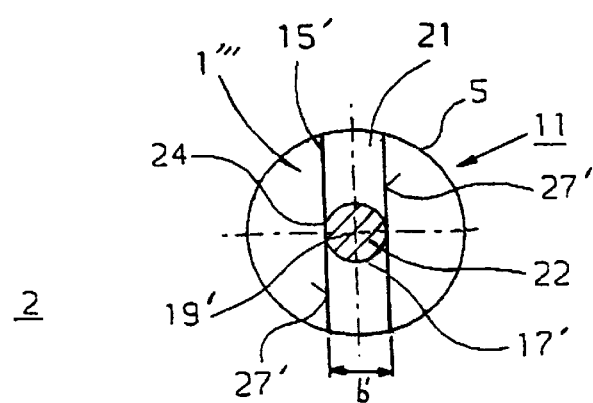
Fig.2a  Fig.2b

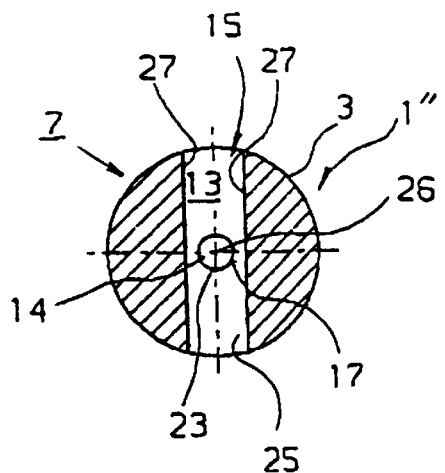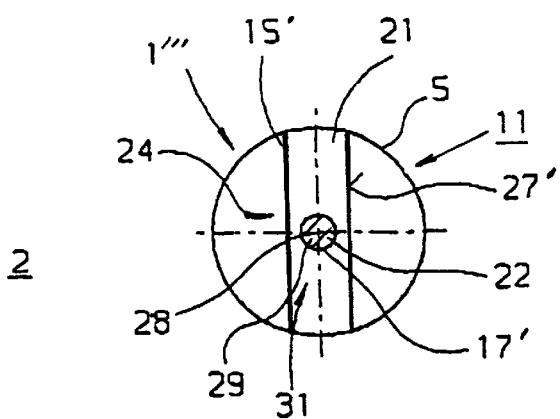
Fig. 3a　　Fig. 3b
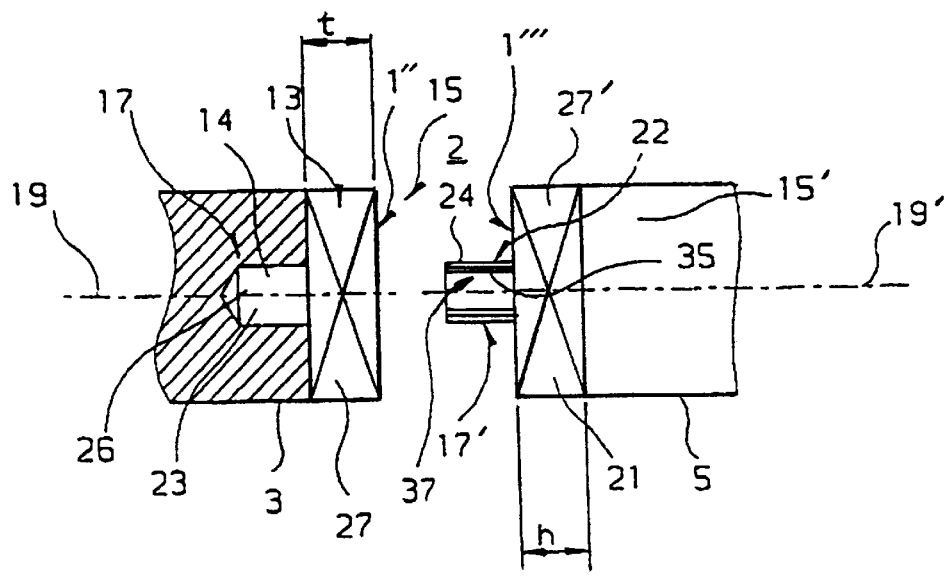
Fig. 4
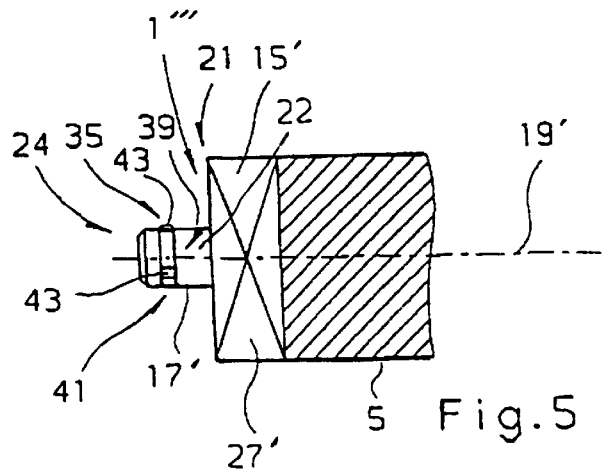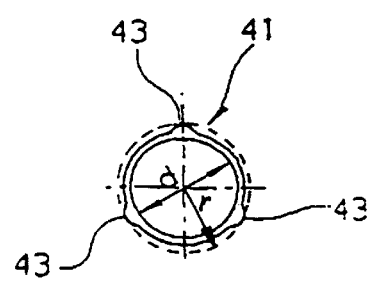
Fig. 5　　Fig. 6

SHAFT COUPLING WITH AXIAL ALIGNMENT

BACKGROUND OF THE INVENTION

The invention relates to a shaft coupling which connects two shafts to transmit torque, wherein one shaft end has at least one recess and/or one projection, and the other cooperating shaft end has at least one projection and/or one recess and these are coupled.

Shaft couplings of this type are known. For example, one type is formed by a bar which projects from one shaft end, in particular the front end, and which engages in a corresponding groove in the front end of the other shaft. A positive lock of this type transmits torques from a driving shaft to a driven shaft. However, these shaft couplings operate fault free only when the two shafts are satisfactorily aligned. To achieve this, centering pins and bores have been provided on the housing parts that accommodate the shafts. However, this merely aligns the housing parts.

For example, this principle is used in motor vehicles, where vacuum pumps are aligned with the aid of centering pins on the cylinder head or on the engine block of an internal combustion engine. If faulty positioning or axial offset occurs on account of mounting errors and/or tolerances between the shaft and the housing, the shaft coupling may be very quickly damaged or destroyed. This happens because the bar of one shaft, which engages in the groove in the other shaft, jams. The drive to the pump may stall. An attempt to prevent this comprises allowing a specific clearance between the bars and the corresponding grooves. However, upon faulty positioning of the shafts, such play promotes so-called edge bearing. Impermissibly high area stresses or edge pressures occur, and these may rapidly wear or even destroy the shaft coupling. To counteract this, the load bearing surfaces of the bars and of the grooves are designed spherical. For spherical surfaces, flattening of the points of contact takes place under compressive forces. In excessively high compressive forces, this effect, known as "Hertzian stress", causes flattening and plastic deformation of the bar or groove.

Furthermore, the prior art suggests compensating for axial offset or angular misalignment of the shafts by interposing an articulated coupling. Such a coupling may comprise elastic articulated shafts, cardan joints or a generally known Oldham coupling. However, production of such couplings has proven to be costly. Furthermore, the overall length and weight of the overall arrangement are increased by a coupling placed onto the shaft ends. In addition, it is disadvantageous here that, in modern motor vehicle engines, particularly on the cam shaft, relatively high angular accelerations occur, which have the effect of extremely loading the ancillary units driven by the camshaft. As a result of the play in the coupling, the angular accelerations which act on the shafts of the ancillary units may even be increased by a factor of 2 to 4.

Prior art measures are not aimed at avoiding faulty positioning of the shafts, but merely at compensating for its occurrence. This leads to the disadvantages already discussed.

SUMMARY OF THE INVENTION

It is therefore the object of the invention to provide a shaft coupling in which the shafts are aligned.

This object is achieved with a shaft coupling having following the features. A shaft coupling for connecting two shaft ends to transmit torque includes one shaft end having a recess or a projection and the other shaft end also having a recess or a projection. Where there is a recess in one shaft end and a projection on the other shaft end, the projection projects into the recess. The projection and the recess may each have cooperating flat sidewalls.

A centering device on at least one shaft end cooperates with at least one mating centering device on the other shaft end for axially aligning the shaft ends. These may comprise a cylinder or pin at one shaft end and a correspondingly shaped and sized pin receiving recess on the other shaft end, which are in addition to the torque transmitting projection and recess.

The centering devices directly align the shafts. This also avoids faulty positioning, particularly axial offset. This shaft coupling, therefore, reduces the overall length and the weight of a pump unit and also may reduce production costs.

In a preferred embodiment, one centering device is a projection and the mating centering device is a recess that accommodates the projection. As a result, during mounting, a pump shaft can be plugged in a positive locking manner and essentially without play into the drive shaft (camshaft of an internal combustion engine). Correspondingly shaped and sized circular cylindrical design of the recess and of the projection is preferred.

In a particularly preferred embodiment, at least one of the centering device, the mating centering device and/or the connecting element have, at least in some areas, applied material and/or have at least one projection. Applied elastic material on at least one centering device enables secure attachment between the centering devices. The applied material is, for example, a layer that is applied in some areas and, in particular, is realized in the form of a web or webs or as knobs which project. Alternatively, the applied material may be formed by a plug-in part, in particular by a ring on the coupling element. This advantageously achieves the situation where, during the mounting of the shafts, they can be aligned flush. Further, the applied material allows slight play between the shafts during the operation of the pump, since the material or the projection can be deformed or worn away under the action of compressive forces and/or temperature. It is particularly advantageous that, although a very precise alignment of the shafts is carried out during mounting, during operation, play that may occur between the shafts due to thermal distortion is nevertheless reliably compensated for between the recesses and/or projections on the shaft ends.

In a preferred embodiment, the connecting element between two recesses at the shaft ends comprises a pin. Alternatively, a sleeve may be used instead of the pin. However, it is then preferable for the centering device and the mating centering device to be a circularly cylindrical projection.

In a design variant, both the centering device on one shaft end and the mating centering device on the other shaft end are circular cylindrical recesses. The two shaft ends are connected by a connecting element, e.g., a pin, which couples the shafts.

In this further embodiment, the pin does not have material applied, but it is plugged without play into both of the centering device recesses so that there is preferably slight pressure on the pin at both recesses. Such a connecting element may have a predetermined fracture point which fractures in the event of a corresponding axial offset or alignment error. This likewise advantageously ensures that the shaft of the pump is precisely aligned with the driving shaft at the time it is mounted, but that during the pump operation, an axial offset can in turn be compensated for by the recess and/or the projection on the shaft ends.

Other objects and features of the invention are explained below with reference to the drawings.

BRIEF DESCRIPTION OF THE DRAWINGS

FIGS. 1a and 1b show end views of the two cooperating shaft ends of a first embodiment of a shaft coupling, FIGS. 2a and 2b show end views of the two shaft ends of a second embodiment of the shaft coupling, FIGS. 3a and 3b shows end views of the two cooperating shaft ends of a third embodiment of the shaft coupling, FIG. 4 shows a side view of the second shaft coupling embodiment of FIG. 2, FIG. 5 shows a side view of a fourth embodiment of the shaft coupling, FIG. 6 shows a partial end view of one part of the shaft coupling in FIG. 5.

DESCRIPTION OF PREFERRED EMBODIMENTS

Figure 7:
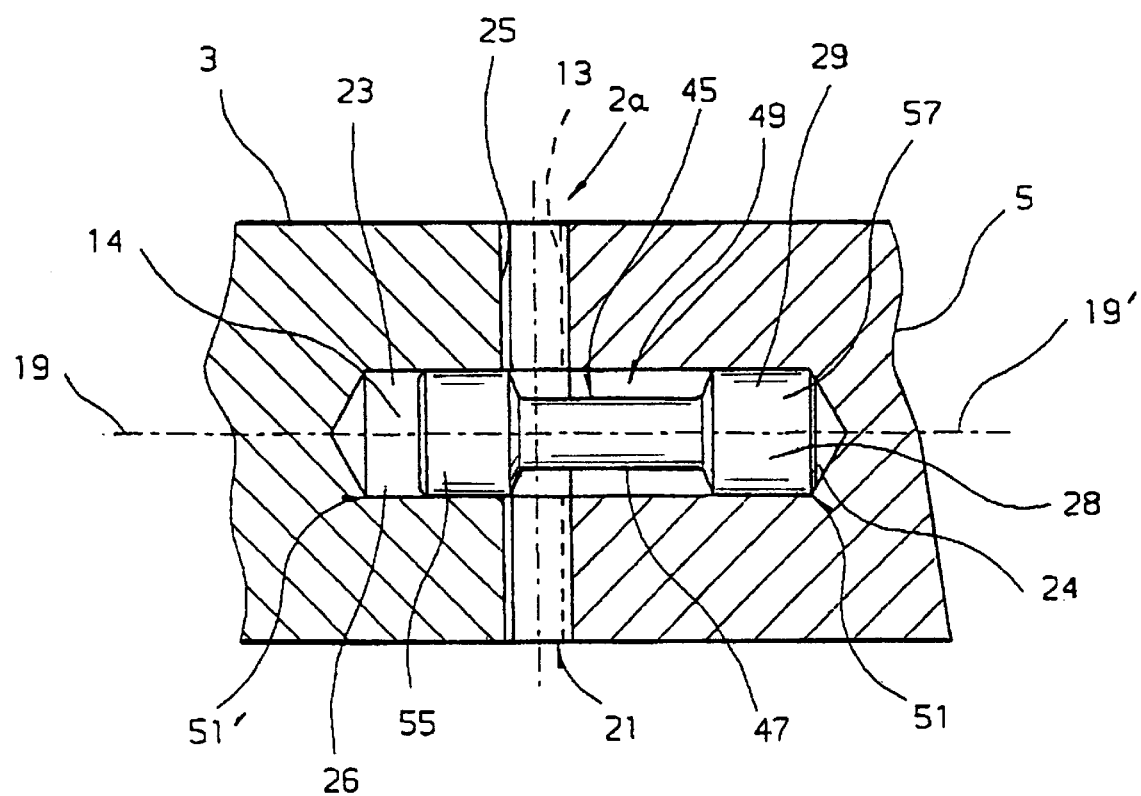
FIG. 7 shows a side view of a fifth embodiment of the shaft coupling.

In the following, it is assumed, for example, that the driven shaft is the shaft of a vacuum pump, while the shaft driving the pump shaft is the camshaft of a motor vehicle engine.

FIG. 1a shows an end 1 of a pump shaft 3 and FIG. 1b shows an end 1' of a drive shaft 5, which shaft ends may be connected for transmitting torque. The pump shaft 3 is rotatably mounted and projects from a flange 7 of a pump housing (not shown) of a vacuum pump. The drive shaft 5 is, for example, the camshaft 9 of an engine (not shown) of a motor vehicle, and is rotatably mounted in a cylinder head 11 or engine block.

The shaft end 1 includes a recess 13, which is comprised of two opposed, transverse direction, flattened side, parallel wall regions 15 and a further radially central recess 14 having a cylindrical region 17. The recess 13 is preferably open at its edges. The center of the recess 14 coincides with the central axis 19 of the pump shaft 3.

The cooperating shaft end 1' has a projection 21, also referred to as a double flat, having two opposite, transverse direction, flattened side, parallel wall regions 15'. A further radially central projection 22 forms a cylindrical region 17'. The width of the projection 21 between its flat sided regions 15' is preferably slightly smaller than the width of the flat sided region 15 of the recess 13. This is also true for the cylindrical region 17', which has a marginally smaller diameter than the cylindrical region 17. A center of the projection 22 also coincides with the central axis 19' of the drive shaft 5.

When one of the ends 1 and 1' is plugged into the other, they form a positive locking shaft coupling 2 wherein the recess 14 serves as a centering device 23 and the projection 22 serves as a mating centering device 24.

The second embodiment in FIGS. 2a and 2b is shown with the same reference numbers for corresponding elements. FIG. 2a shows a pump shaft 3 with an end 1". It differs from FIG. 1a only in that the radially central cylindrical region 17 has the same diameter as the width b of the radially neighboring flattened regions 15 of the recess 13. The cylindrical region 17 comprises a bore 26 which opens at the bottom 25 of the recess 13.

The drive shaft 5 illustrated in FIG. 2b has a projection 21 on its end 1'" from which the cylindrical region 17' further extends. They are preferably in one piece. In particular, the diameter b' of the projection 21 is slightly smaller than the width b of the radially neighboring recess 13. The same narrowed width relative dimensions apply to the cylindrical regions 17 and 17'. The shaft coupling 2 according to FIGS. 2 is used, for example, when higher torques are to be transmitted. This is enabled by the fact that the surface area of the side walls 27 and 27' of the cooperating recess 13 and of the projection 21, respectively, in FIG. 2 is greater than the surface areas of the side walls 27 and 27' of the recess 13 and of the projection 21, respectively, in FIG. 1. The side walls 27 and 27' can also be designed to be spherical.

The embodiment of FIGS. 3a and 3b differs from those of FIG. 2 or FIG. 1 only in that the radially central cylindrical region 17 and 17' has a further reduced diameter. To this extent, reference may be made to the description of FIGS. 1 and 2. Corresponding parts are identified in the same reference numbers.

The shaft coupling 2 of FIG. 3 has the cylindrical region 17' of the projection 22 formed by a connecting element 28, particularly a pin 29, which is inserted into a bore 31 in the drive shaft 5. The bore 31 is made at least in the projection 22. Its center likewise coincides with the central axis 19' of the drive shaft 5.

FIG. 4 shows the shaft coupling 2 of FIGS. 2a and 2b in a sectioned side view. The radially central cylindrical regions 17 and 17' act as a first centering device 23 and a second mating centering device 24, respectively, when the two shaft ends are plugged together. For aligning the shafts precisely, the mating centering device 24 has a material 35, which is applied in the form of a web on its surface, extending in the direction of the longitudinal extent of the cylindrical region 17'. The material 35 is applied on some areas of the surface such that preferably three webs 37 are formed and arranged on the surface and so that the webs are offset circumferentially by 120° from one another. The radial height or thickness of the material 35 is such that the mating centering device 24 engages essentially without play in the centering device 23. However, the material 35 can also be applied in the form of knobs or can be formed by a single web which extends like a helix around the circumferential surface of the cylindrical region 17'. Of course, it is also possible to apply a plurality of webs 37, which are arranged offset from one another, preferably by the same angle in each case.

The applied material 35, which is preferably plastic, optimally aligns the two shafts when the pump shaft 3 is mounted on the drive shaft 5, to align the two shafts very precisely. However, the material 35 is applied such that, during operation of the pump, that is, during the transmission of torque from the drive shaft 5 to the pump shaft 3, the applied material can be deformed or worn away by the compressive forces or by a rising temperature.

This permits slight play (a few hundredths of a millimeter) between the centering device 23 and the mating centering device 24, so that in the event of an axial offset, brought about by thermal expansion during operation, by elastic deformation of the shafts, in particular of the camshaft, by bearing play, and the like, optimum transmission of torque is nevertheless possible. It is possible for the projection 21 and the recess 13 to be displaced slightly with respect to each other because of the play. Since the axial height h of the projection 21 is smaller than the axial depth t of the recess 13, the shaft coupling 2 permits longitudinal displacement of the shafts toward each other.

The applied material 35 may, in particular, comprise an elastic material which is deformed elastically during the operation of the pump, that is, it acts like a resilient element. This also makes simple mounting of the shafts possible, as it is distinguished by optimum alignment of the shafts in relation to each other. Jamming of the drive during operation is prevented, because there is a sufficiently large amount of play within the shaft coupling 2. The play is made possible by the deformation and/or wearing away of the applied material 35.

FIG. 5 shows the drive shaft 5 with the projection 21 and 22, and the small diameter cylindrical region 17' which is arranged on the projection 22. In a modification from FIG. 4, the region 17' has an annular groove 39, into which the material 35 is introduced in the form of an annular, plug in part 41. The part 41 includes projections 43 that are offset by 120° from one another. During mounting of the pump shaft 3 on the drive shaft 5, the projections 43 ensure that the shafts align precisely. The plug in part 41 is preferably produced from plastic. It is also possible to provide a plurality of annular grooves 39 in the projection 22, and each may be equipped with a plug in part 41.

FIG. 6 shows, on an enlarged scale, the plug in part 41 with the projections 43. Its internal diameter d is the same size as, or somewhat smaller than, the diameter of the bottom (not illustrated) of the annular groove 39, so that the plug in part 41 rests securely on the bottom of the annular groove but is not deformed. The radius r of the circumscribing circle (illustrated with dashed lines) of the plug-in part 41 is essentially the same size as the radius of the bore 26, so that the mating centering device 24 is guided without play in the centering device 23.

The embodiment of FIG. 7 shows a shaft coupling 2a which, in relation to the recess 13 and the projection 21, essentially corresponds to the embodiment of FIGS. 3a and 3b. However, the centering device is a pin 29 that projects into recesses 23 and 24 in both shaft ends. The pin 29 has a reduced diameter section 45, which is preferably its intended fracture region 47. The pin 29 cooperates with the centering device 24 and with the centering device 23. The centering device 24 is formed here by a bore 49, which preferably reaches into the core of the drive shaft 5. During mounting, the pin 29 is plugged into the bore 49 of the drive shaft 5 until it reaches the end stop 51. The pump shaft 3 is then plugged on by way of the centering device 23, which is also formed by a bore 26 in this case and it has an end stop 51' for the shifting pin.

Upon occurrence of an alignment error, the reduced section 45 ensures that the pump shaft 3 and the drive shaft 5 can be deflected with respect to each other during the operation of the pump. The reduced section 45 may either be deformed elastically or, as mentioned, it is an intended fracture point 47.

Instead of the end stops 51 and 51', it is also possible to design one or both bores 49 and 26 as conical in shape, to ensure the most play free alignment of the two shafts in relation to each other during mounting. Alternatively, it is also possible to design the pin 29 as conical at its two end regions 55 and 57.

Figure 8:
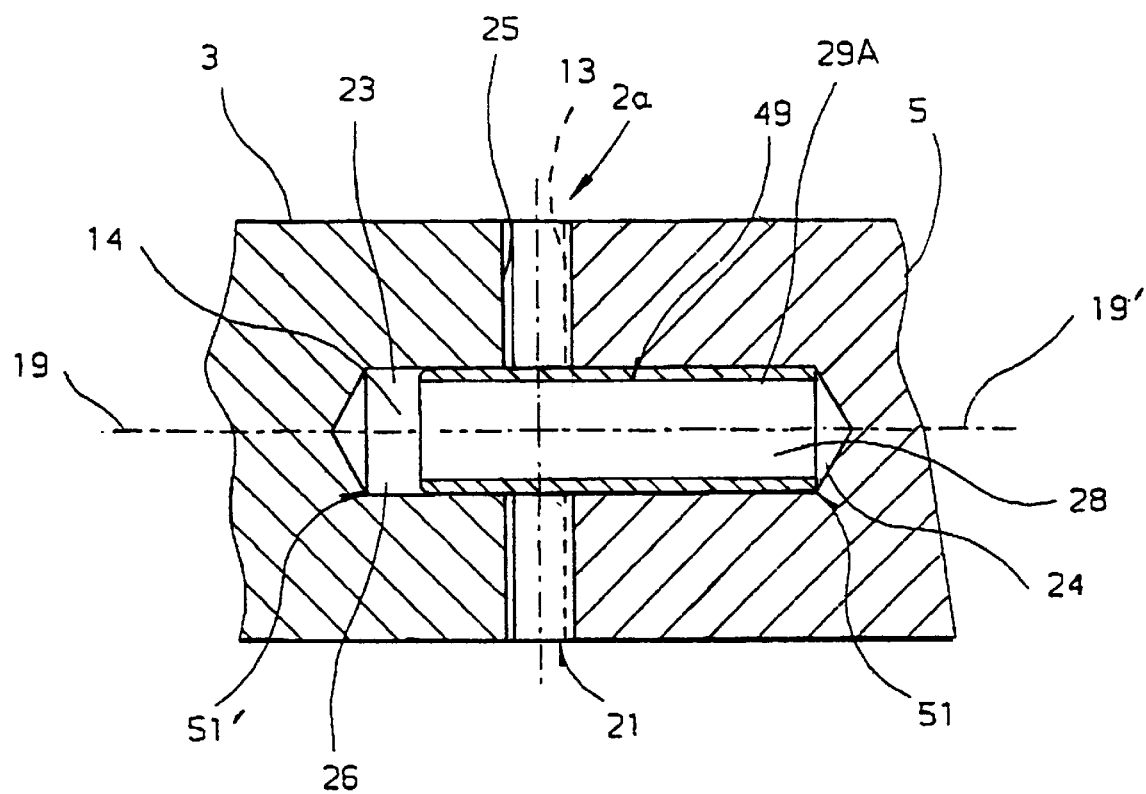
FIG. 8 shows a side view of a sixth embodiment of the shaft coupling.

The sixth embodiment of FIG. 8 differs from that of FIG. 7 in that the pin 29 shown in FIG. 7 is replaced with a hollow sleeve 29A. In other respects, FIGS. 7 and 8 correspond and the same reference numerals have been used.

All of the above clearly demonstrates that the novel shaft coupling ensures optimum alignment without alignment errors when the shaft ends are plugged together. The housing parts which accommodate the shafts are then fastened to one another. But it is also possible, during operation, nevertheless to compensate reliably for an axial offset, for example one produced by thermal expansion.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A shaft coupling for connecting two shafts for transmitting torque comprising:

a first shaft having an end with an axial projection;

a second shaft having an end with an axial recess;

the projection and the recess cooperating for transmitting torque;

a first centering device on the end of said first shaft and a cooperating mating second centering device on the end of said second shaft, the first and second centering devices cooperating for aligning the shafts, wherein one of the first and second centering devices comprises an axially projecting centering projection and the other of the first and second centering devices comprises a centering recess for accommodating the centering projection; and an elastic material applied and rigidly connected to at least one of the first and second centering devices of a size and nature which holds the first and second centering devices and the respective shaft ends securely engaged and aligned.

2. The shaft coupling of claim 1, wherein the projection extending axially out of the end of said first shaft is generally shaped to be received in the recess for transmitting torque when the ends of said first and second shafts are brought together.

3. The shaft coupling of claim 1, wherein the centering projection and the centering recess are both circular cylindrical in shape.

4. The shaft coupling of claim 1, further comprising a material applied to at lease one of the first and second centering devices of a size and nature which holds the first and second centering devices and the respective shaft ends securely engaged.

5. The shaft coupling of claim 4, wherein the applied material comprises a plug-in-part applied to the respective first and second centering devices.

6. The shaft coupling of claim 5, wherein the respective first and second centering devices includes a plug in recess in which the plug-in part is disposed.

7. The shaft coupling of claim 4, wherein the applied material is in the form of a surface coating on the respective one of the first and second centering devices.

8. The shaft coupling of claim 7, wherein the applied material is of the type that can be deformed or worn away under the action of at least one of compressive forces and temperature.

9. The shaft coupling of claim 7, wherein the applied material includes a plurality of projections outwardly therefrom for enabling secure engagement with the other of the first and second centering devices.

10. A shaft coupling for connecting two shafts for transmitting torque comprising:

a first shaft having an end with an axial projection;

a second shaft having an end with an axial recess;

the projection and the recess cooperating for transmitting torque;

a first centering device on the end of said first shaft and a cooperating mating second centering device on the end of said second shaft, the first and second centering devices cooperating for aligning the shafts;

a connecting element for coupling the first and the second centering devices; and an elastic material applied and rigidly connected to at least one of the first and second centering devices of a size and nature which holds the first and second centering devices and the respective shaft ends securely engaged and aligned.

11. The shaft coupling of claim 10, wherein the first and second centering devices comprise a centering recess in each of the ends of the first and second shafts and a connecting element extending into the respective centering recesses of the ends of the first and second shafts, and the centering recesses and the connecting element are shaped as to position and align the shaft ends.

12. The shaft coupling of claim 11, wherein the connecting element is in the shape of a pin.

13. The shaft coupling of claim 11, wherein the connecting element includes a reduced diameter region along the length thereof with ability for fracturing.

14. The shaft coupling of claim 11, wherein the connecting element is in the form of a sleeve.

15. The shaft coupling of claim 2, wherein the projection includes a radially extending bar with opposite walls and the recess includes cooperatingly shaped and oriented walls for engaging the walls of the projections.

16. The shaft coupling of claim 15, wherein the walls are generally spherical.

* * * * *